United States Patent
Menheere et al.

(10) Patent No.: US 12,540,580 B1
(45) Date of Patent: Feb. 3, 2026

(54) AUTOMATIC BLEED VALVE

(71) Applicant: Pratt & Whitney Canada Corp., Longueuil (CA)

(72) Inventors: Dave Menheere, Norval (CA); Jason Herborth, Acton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/191,681

(22) Filed: Apr. 28, 2025

(51) Int. Cl.
*F02C 9/18* (2006.01)
*F02C 6/08* (2006.01)
*F16K 31/00* (2006.01)
F02B 37/16 (2006.01)
F02D 41/00 (2006.01)
F04D 27/02 (2006.01)

(52) U.S. Cl.
CPC .............. *F02C 9/18* (2013.01); *F02C 6/08* (2013.01); *F16K 31/002* (2013.01); F02B 37/16 (2013.01); F02D 41/0007 (2013.01); F04D 27/0215 (2013.01); F05D 2260/606 (2013.01)

(58) Field of Classification Search
CPC .. F02C 9/18; F02C 6/08; F16K 31/002; F02B 37/16; F02D 41/0007; F04D 27/0215
See application file for complete search history.

(56) References Cited

U.S. PATENT DOCUMENTS

| | | | |
|---|---|---|---|
| 4,195,774 A | 4/1980 | Warner | |
| 5,351,476 A | 10/1994 | Laborie et al. | |
| 6,427,712 B1* | 8/2002 | Ashurst | E03B 7/10 60/527 |
| 9,261,022 B2 | 2/2016 | Saha et al. | |
| 11,187,345 B2 | 11/2021 | Srinivasa | |
| 11,493,941 B2 | 11/2022 | Quevallier | |
| 2007/0234738 A1* | 10/2007 | Borcea | F02C 9/18 60/785 |
| 2013/0336757 A1* | 12/2013 | Subbareddyar | F02C 7/18 415/1 |
| 2020/0217305 A1* | 7/2020 | Broccolini | F03G 7/06112 |

OTHER PUBLICATIONS

Ogontz Corp. F Series Fluid Temperature Sensing Valves Brochure (Year: 2006).*

* cited by examiner

*Primary Examiner* — Gerald L Sung
*Assistant Examiner* — Rene D Ford
(74) *Attorney, Agent, or Firm* — CANTOR COLBURN LLP

(57) ABSTRACT

A compressor bleed valve of a gas turbine engine includes a valve support, and a valve element positioned at the valve support and movable relative to the valve support from an open position into a closed position engaged with a valve seat. The movement of the valve element toward the closed position is driven by a phase change of a volume of phase change material disposed in the valve support between the valve support and the valve element.

20 Claims, 4 Drawing Sheets

AUTOMATIC BLEED VALVE

FIELD

Illustrative embodiments pertain to the art of gas turbine engines, and specifically to configurations and features of compressors of gas turbine engines.

BACKGROUND

Gas turbine engines are configured to combust fuel with air to generate a drive force for rotationally driving shafts and associated components to produce thrust for flight. Such engines typically include a fan, a compressor section, a combustor section, and a turbine section. Some engine configurations are designed with core flow and bypass flow paths, with a core flow directed through the compressor section for compression, combustion within the combustor section, and then expansion through the turbine section, prior to be exhausted from a nozzle of the engine. In some engine configurations, air may be extracted from compressor stages of the compressor section as bleed air and supplied to other parts of the engine or to other aircraft systems for various purposes, such as cooling, lubrication, supplying air for humans on the aircraft, or the like. In some gas turbine engine configurations, such as single-use gas turbine engines, it is desired to have a bleed valve that is in an open position at engine start, to bleed excess pressure and allowing for easier rotation of the impeller and faster starting of the gas turbine engine. Once start is accomplished, the bleed valve remains closed for the remainder of operation of the gas turbine engine.

SUMMARY

In an embodiment, a compressor of a gas turbine engine includes one or more compressor rotors arranged along a compressor flowpath configured to compress an airflow directed alone the compressor flowpath, and a bleed pathway configured to selectably divert a portion of the airflow from the compressor flowpath as a bleed airflow. A bleed valve is positioned along the bleed pathway to control the flow of the bleed airflow therethrough. The bleed valve includes a valve support and a valve element positioned at the valve support and movable relative to the valve support from an open position into a closed position engaged with a valve seat. The movement of the valve element toward the closed position is driven by a phase change of a volume of phase change material positioned in the valve support between the valve support and the valve element. The bleed valve is configured so that valve element is in the open position during startup of the gas turbine engine, and in the closed position after startup of the gas turbine engine Additionally or alternatively, in this or other embodiments the valve element includes a valve piston engageable with the valve seat, and a valve stem extending from the valve piston, the valve stem received in a support cavity of the valve support. The volume of phase change material is positioned in the support cavity.

Additionally or alternatively, in this or other embodiments the valve piston is substantially circular.

Additionally or alternatively, in this or other embodiments the volume of phase change material is configured to be heated by a flow of bleed air directed past the bleed valve, and to change phase from solid to liquid via a heating.

Additionally or alternatively, in this or other embodiments the volume of phase change material is a wax material.

Additionally or alternatively, in this or other embodiments a bleed cavity is positioned between the compressor flowpath and the bleed valve.

Additionally or alternatively, in this or other embodiments one or more bleed openings connect the compressor flowpath and the bleed cavity.

Additionally or alternatively, in this or other embodiments the bleed valve is configured to control flow of the bleed airflow from the bleed cavity.

In another embodiment, a gas turbine engine includes a combustor, a turbine driven by products of the combustor, and a compressor operably connected to the turbine. The compressor includes one or more compressor rotors arranged along a compressor flowpath configured to compress an airflow directed alone the compressor flowpath. The one or more compressor rotors are driven by rotation of the turbine. A bleed pathway is configured to selectably divert a portion of the airflow from the compressor flowpath as a bleed airflow, and a bleed valve is positioned along the bleed pathway to control the flow of the bleed airflow therethrough. The bleed valve includes a valve support, and a valve element positioned at the valve support and movable relative to the valve support from an open position into a closed position engaged with a valve seat. The movement of the valve element toward the closed position is driven by a phase change of a volume of phase change material positioned in the valve support between the valve support and the valve element. The bleed valve is configured so that valve element is in the open position during startup of the gas turbine engine, and in the closed position after startup of the gas turbine engine Additionally or alternatively, in this or other embodiments the valve element includes a valve piston engageable with the valve seat, and a valve stem extending from the valve piston. The valve stem is received in a support cavity of the valve support, and the volume of phase change material is positioned in the support cavity.

Additionally or alternatively, in this or other embodiments the valve piston is substantially circular.

Additionally or alternatively, in this or other embodiments the volume of phase change material is configured to be heated by a flow of bleed air directed past the bleed valve, and to change phase from solid to liquid via a heating.

Additionally or alternatively, in this or other embodiments the volume of phase change material is a wax material.

Additionally or alternatively, in this or other embodiments a bleed cavity is located between the compressor flowpath and the bleed valve.

Additionally or alternatively, in this or other embodiments the bleed valve is configured to control flow of the bleed airflow from the bleed cavity.

In yet another embodiment, a method of operating a gas turbine engine includes rotating a compressor, thereby urging an airflow through the compressor to compress and heat the airflow, and diverting a portion of the airflow from the compressor through a compressor bleed valve and along a bleed pathway. The compressor bleed valve includes a valve support, and a valve element positioned at the valve support and movable relative to the valve support from an open position into a closed position engaged with a valve seat. A volume of phase change material positioned in the valve support between the valve support and the valve element is heated, thus causing a phase change and expansion of the phase change material. The compressor bleed valve is closed by moving the valve element from the open position to the closed position via the expansion of the phase change material.

Additionally or alternatively, in this or other embodiments the phase change is from a solid phase to a liquid phase.

Additionally or alternatively, in this or other embodiments the valve element includes a valve piston engageable with the valve seat, and a valve stem extending from the valve piston. The valve stem is received in a support cavity of the valve support. The volume of phase change material is positioned in the support cavity.

Additionally or alternatively, in this or other embodiments the valve piston is substantially circular.

Additionally or alternatively, in this or other embodiments the phase change material is a wax material.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
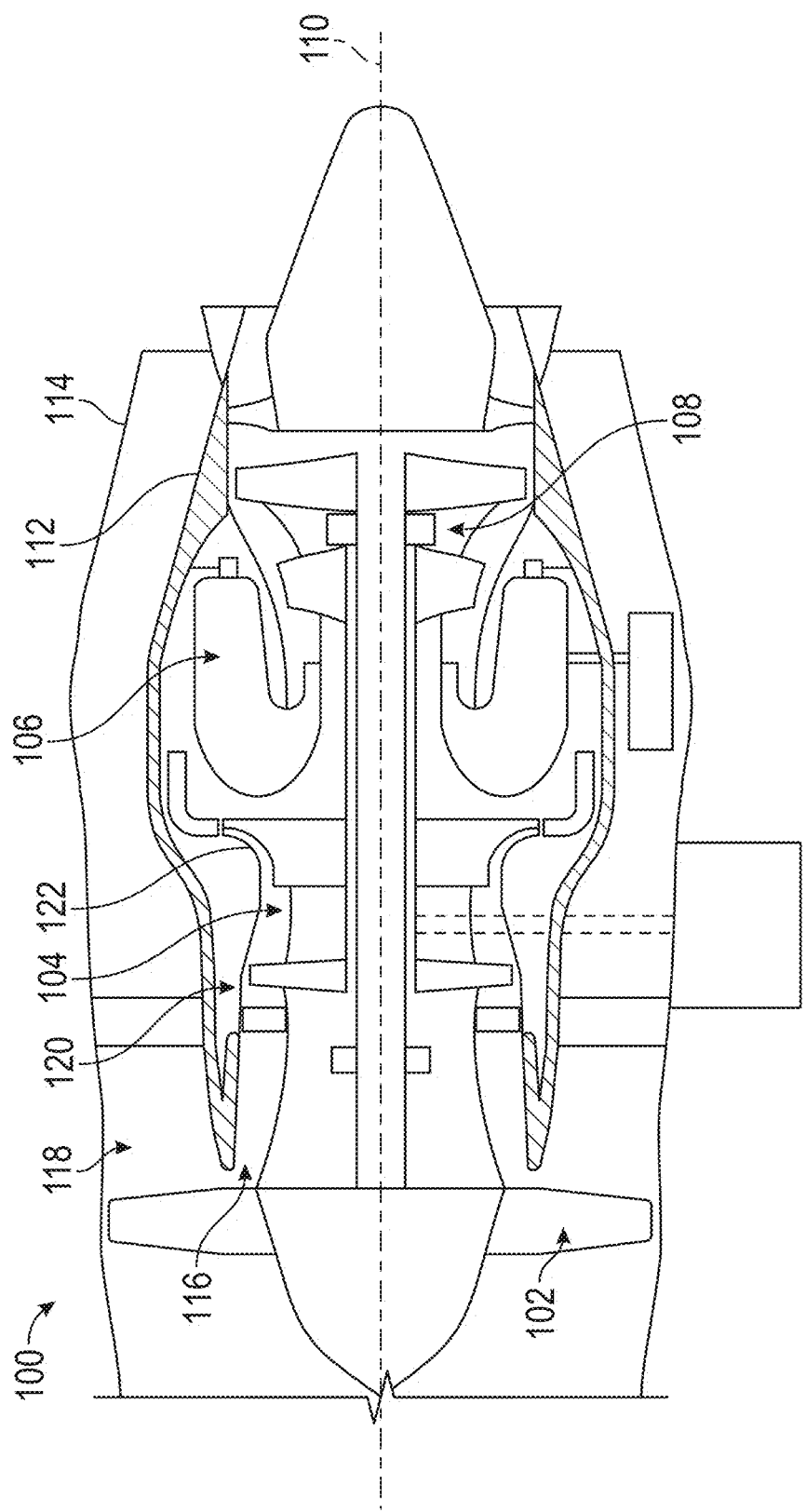
FIG. 1 is a schematic cross-sectional illustration of a gas turbine engine that may incorporate embodiments of the present disclosure.

FIG. 1 is a schematic illustration of a gas turbine engine 100 that may incorporate embodiments of the present disclosure. The gas turbine engine 100 includes, arranged in serial flow communication, a fan section 102 through which ambient air is propelled, a compressor section 104 for pressurizing the air, a combustor section 106 in which the compressed air is mixed with fuel and ignited for generating a stream of hot combustion gases, and a turbine section 108 for extracting energy from the combustion gases. The sections 102, 104, 106, 108 may be axially arranged along an engine axis 110 and arranged within an engine housing 112 which in turn is arranged within an engine nacelle 114. The gas turbine engine 100 defines a core flow path 116 directed from the fan section 102 and into the engine housing 112 through the compressor section 104, the combustor section 106, and the turbine section 108. A bypass flow path 118 is defined between the engine housing 112 and the engine nacelle 114.

The gas turbine engine 100 may be mounted on an aircraft, such as on a wing, fuselage, tail, or the like. The gas turbine engine 100 is configured to generate and provide propulsion to the aircraft. In additional to generating thrust and propulsive force, the gas turbine engine 100 may be configured to implement additional functions. For example, the gas turbine engine 100 may be configured to generate and provide a supply of pressurized air, which may be referred to as bleed air, to other aircraft systems. The other aircraft systems may be parts of the gas turbine engine 100 or may be parts or systems of the aircraft. The bleed air may be drawn from the compressor section 104 and supplied to various systems through a bleed duct 120. The bleed air may be, for example, used for cooling parts of the combustor section 106 and/or the turbine section 108. In some arrangements, the bleed air may be employed as a heat source, for example, for cabin environmental controls, anti-icing systems or the like. It will be appreciated that the bleed air may be extracted and directed to various onboard systems for various heating, cooling, and/or pressurizing purposes. The bleed air may be extracted from the compressor section 104, and more particularly, may be extracted from an impeller 122 of the compressor section 104. The impeller 122, as illustrated, is a centrifugal compressor that is arranged to turn an axial flow of the core flow through the core flow path 116 to a radial flow prior to mixing with fuel for combustion within the combustor section 106.

Figure 2:
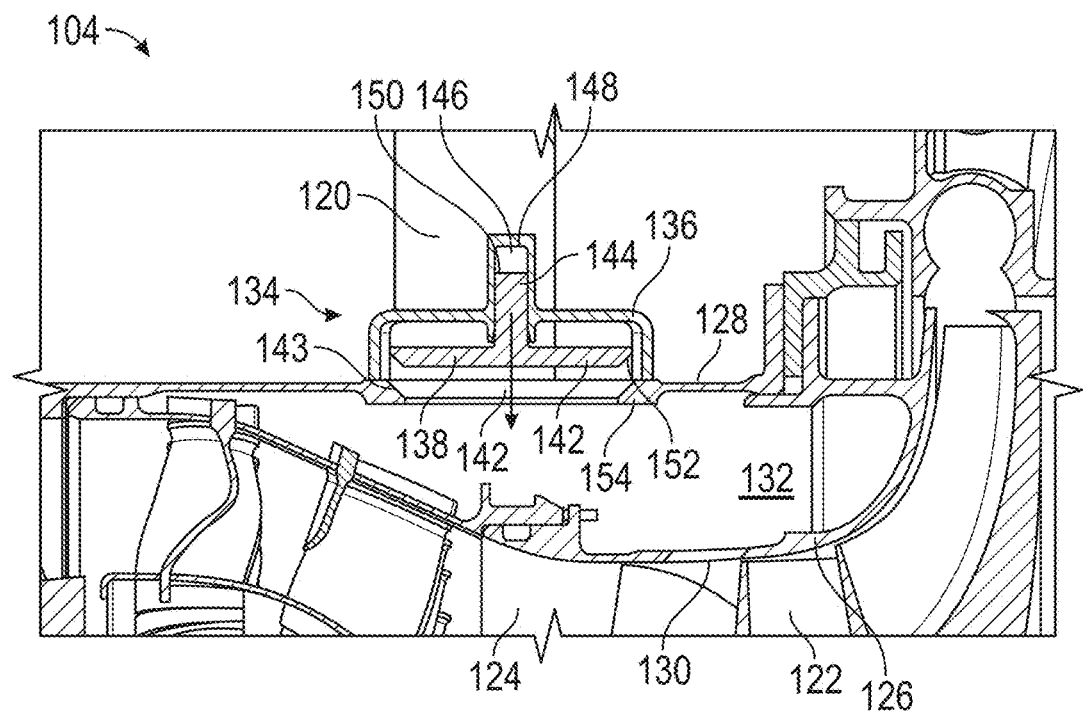
FIG. 2 is a schematic illustration of a portion of a compressor of a gas turbine engine.

Referring now to FIG. 2, illustrated is a portion of the compressor section 104 including the impeller 122. The impeller 122 extends across a compressor flowpath 124, which is at least partially defined by a radially outer flowpath wall 126. A bleed cavity 132 is defined radially between the radially outer flowpath wall 126 and a radially outer bleed cavity wall 128, which is positioned radially outboard of the radially outer flowpath wall 126. One more bleed openings 130, such as slots or holes, extend through the radially outer flowpath wall 126 allowing the bleed air to flow from the compressor flowpath 124 into the bleed cavity 132. A bleed valve 134 is located at the radially outer bleed cavity wall 128 and connects the bleed cavity 132 to the bleed duct 120.

A duct inlet 142 of the bleed duct 120 is located at the radially outer bleed cavity wall 128. The bleed valve 134 is located at the duct inlet 142 and includes a valve support 136 secured to the radially outer bleed cavity wall 128 and in some embodiments spanning across the duct inlet 142. A valve element 138 is positioned in and is supported by the valve support 136. The valve element 138 includes a valve piston 140 which in configured to be positioned out of a valve seat 143 at the duct inlet 142 to allow bleed air into the bleed duct 120, and to be positioned in the valve seat 143 thereby blocking the bleed air from flowing into the bleed duct 120 from the bleed cavity 132. A valve stem 144 extends from the valve piston 140 and is positioned in a support cavity 146 of the valve support 136.

The bleed valve 134 includes a volume of phase change material positioned in the support cavity 146 between a support cavity end wall 148 of the support cavity and a valve stem tip 150 of the valve stem 144. In some embodiments, the phase change material is a wax material, but one skilled in the art will readily appreciate that other phase change materials may be utilized.

Figure 3:
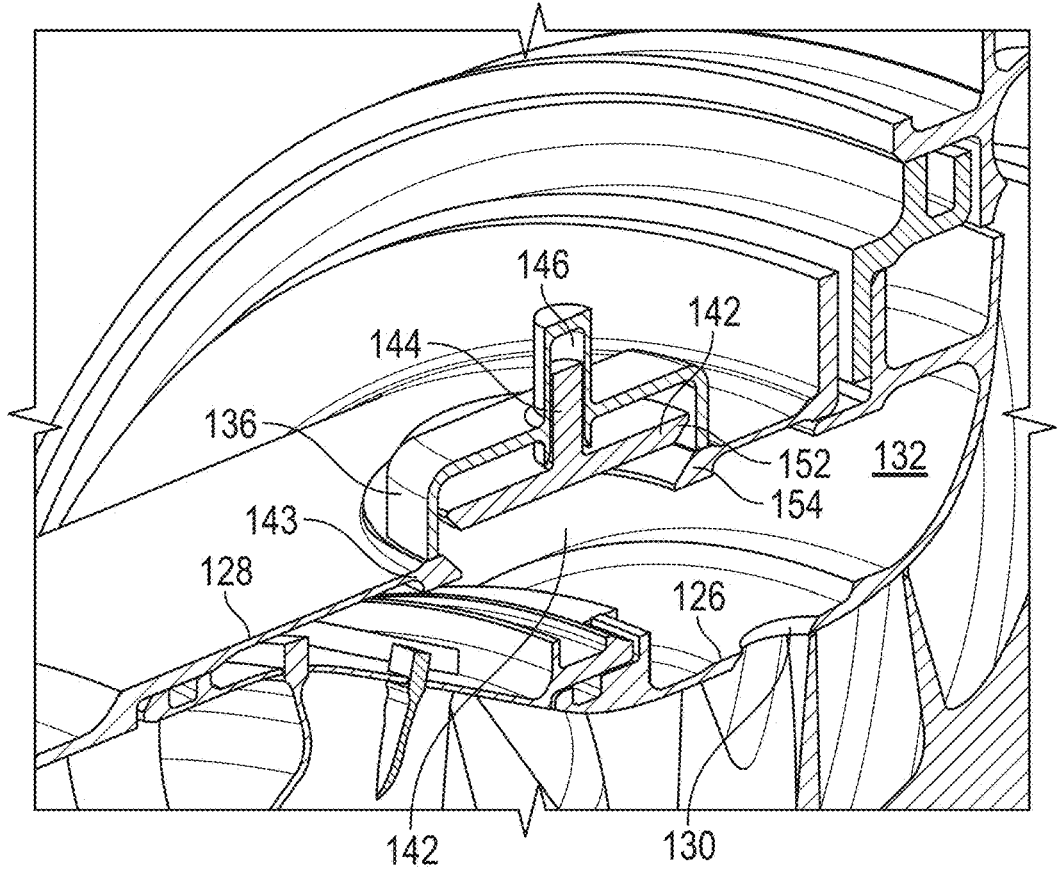
FIG. 3 is a partial cross-sectional view of a compressor bleed valve in an open position.
Figure 4:
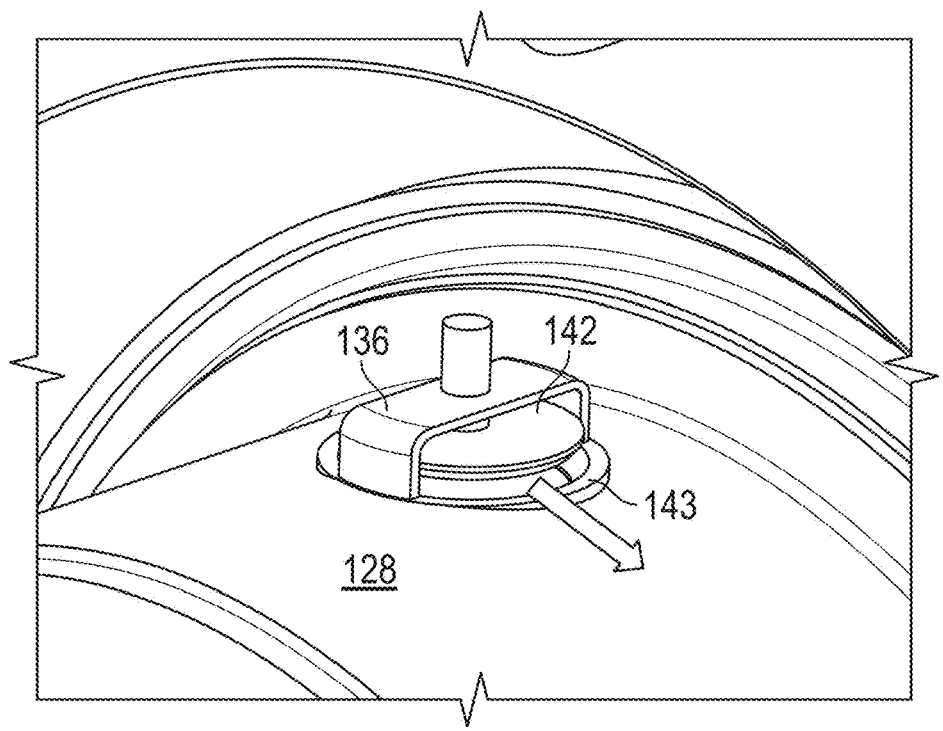
FIG. 4 is a perspective view of a compressor bleed valve in the open position.
Figure 5:
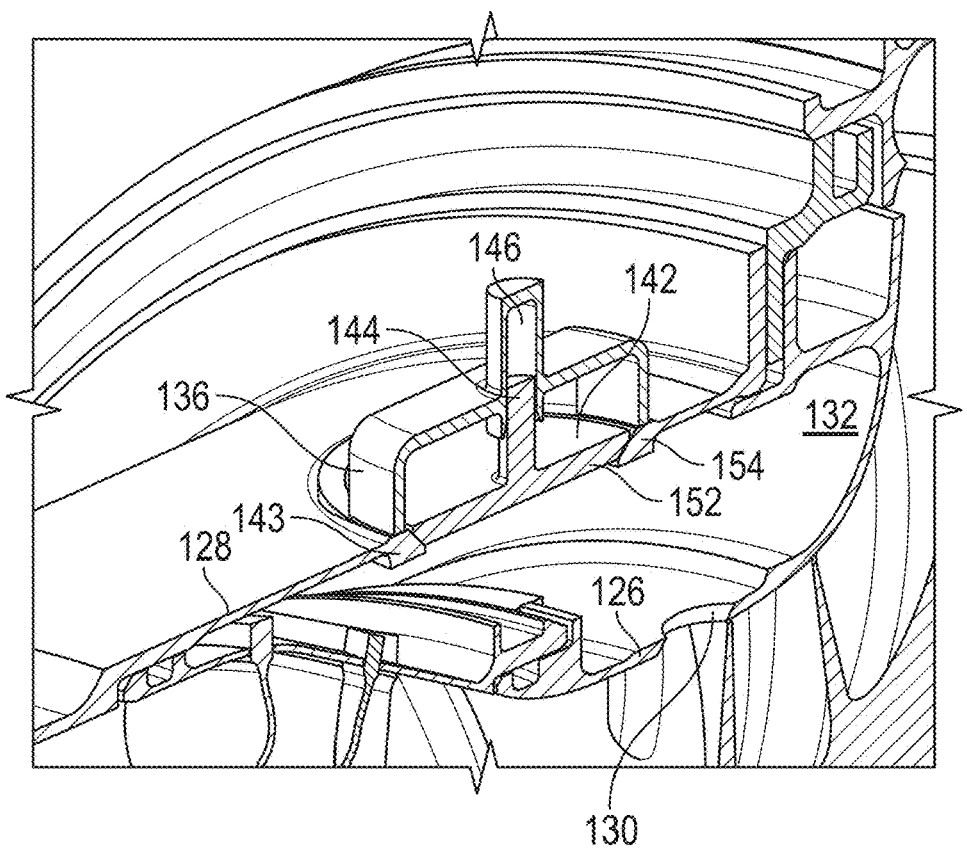
FIG. 5 is a partial cross-sectional view of a compressor bleed valve in a closed position.
Figure 6:
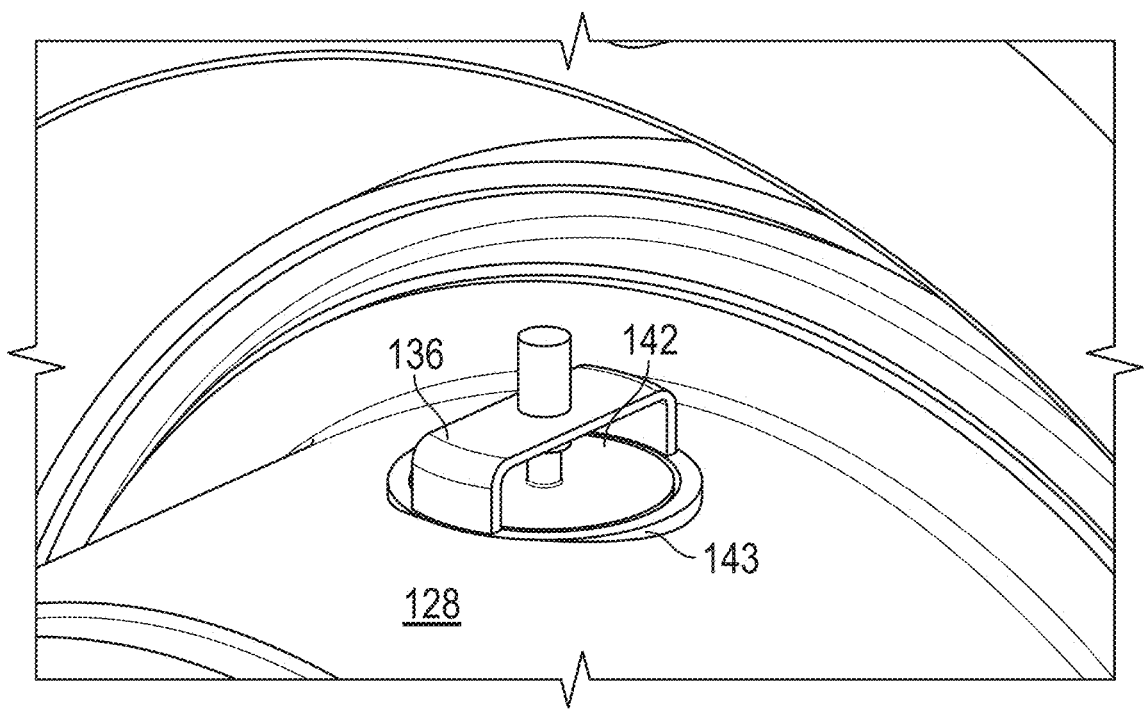
FIG. 6 is a perspective view of a compressor bleed valve in the closed position.

Referring now to FIGS. 3 and 4, initially the phase change material in the support cavity 146 is in solid phase with the bleed valve 134 in an open position allowing bleed air through the duct inlet 142. The start sequence of the gas turbine engine 100 is initiated, and the excess air pressure is passed through the duct inlet 142, allowing for easier rotation of the compressor and faster startup of the gas turbine engine 100. After the initial start sequence, the compressor section 104 generates pressure which heats the airflow, causing the bleed air to melt the phase change material, changing its state from sold to liquid. This expands the volume of phase change material, which in turn urges the valve element 138 into the valve seat 143 thus closing the bleed valve 134, as illustrated in FIGS. 5 and 6. In some embodiments, the valve element 138 has a circular peripheral configuration, which is configured to fit and seal to a circular valve seat 143. The valve element 138 may include a tapered element peripheral surface 152 that is configured to match a tapered seat surface 154 of the valve seat 143. While in the illustrated embodiment the valve element 138 is configured to be positioned inside the valve seat 143 when in the closed position, in other embodiments the valve element 138 is configured to cover the valve seat 143, or be located radially outboard of the valve seat 143 when in the closed position.

The configurations disclosed herein provide a cost effective and reliable bleed valve solution, especially for those engine configurations where the bleed valve is a single use component.

As used herein, the terms "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein. Further, the terms "about" and "substantially", when associated with non-numerical limits, are intended to include degrees of errors and/or minor variations as would be apparent to those of skill in the art when considering such concepts (e.g., shapes, relative arrangements, etc.).

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor of a gas turbine engine, comprising:
   one or more compressor rotors arranged along a compressor flowpath configured to compress an airflow directed alone the compressor flowpath;
   a bleed pathway configured to selectably divert a portion of the airflow from the compressor flowpath as a bleed airflow;
   a bleed valve disposed along the bleed pathway to control the flow of the bleed airflow therethrough, the bleed valve including:
      a valve support;
      a valve element disposed at the valve support and movable relative to the valve support from an open position into a closed position engaged with a valve seat;
      wherein the movement of the valve element toward the closed position is driven by a phase change of a volume of phase change material disposed in the valve support between the valve support and the valve element;
   wherein the bleed valve is configured so that valve element is in the open position during startup of the gas turbine engine, and in the closed position after startup of the gas turbine engine.

2. The compressor of claim 1, wherein:
   the valve element includes a valve piston engageable with the valve seat, and a valve stem extending from the valve piston, the valve stem received in a support cavity of the valve support; and
   the volume of phase change material is disposed in the support cavity.

3. The compressor of claim 2, wherein the valve piston is substantially circular.

4. The compressor of claim 1, wherein the volume of phase change material is configured to be heated by a flow of bleed air directed past the bleed valve, and to change phase from solid to liquid via a heating.

5. The compressor of claim 1, wherein the volume of phase change material is a wax material.

6. The compressor of claim 1, further comprising a bleed cavity disposed between the compressor flowpath and the bleed valve.

7. The compressor of claim 6, further comprising one or more bleed openings connecting the compressor flowpath and the bleed cavity.

8. The compressor of claim 6, wherein the bleed valve is configured to control flow of the bleed airflow from the bleed cavity.

9. A gas turbine engine comprising:
   a combustor;
   a turbine driven by products of the combustor;
   a compressor operably connected to the turbine, the compressor including:
      one or more compressor rotors arranged along a compressor flowpath configured to compress an airflow directed alone the compressor flowpath, the one or more compressor rotors driven by rotation of the turbine;
      a bleed pathway configured to selectably divert a portion of the airflow from the compressor flowpath as a bleed airflow; and
      a bleed valve disposed along the bleed pathway to control the flow of the bleed airflow therethrough, the bleed valve including:
         a valve support;
         a valve element disposed at the valve support and movable relative to the valve support from an open position into a closed position engaged with a valve seat;
         wherein the movement of the valve element toward the closed position is driven by a phase change of a volume of phase change material disposed in the valve support between the valve support and the valve element;

wherein the bleed valve is configured so that valve element is in the open position during startup of the gas turbine engine, and in the closed position after startup of the gas turbine engine.

10. The gas turbine engine of claim 9, wherein:

the valve element includes a valve piston engageable with the valve seat, and a valve stem extending from the valve piston, the valve stem received in a support cavity of the valve support; and the volume of phase change material is disposed in the support cavity.

11. The gas turbine engine of claim 10, wherein the valve piston is substantially circular.

12. The gas turbine engine of claim 9, wherein the volume of phase change material is configured to be heated by a flow of bleed air directed past the bleed valve, and to change phase from solid to liquid via a heating.

13. The gas turbine engine of claim 9, wherein the volume of phase change material is a wax material.

14. The gas turbine engine of claim 9, further comprising a bleed cavity disposed between the compressor flowpath and the bleed valve.

15. The gas turbine engine of claim 14, wherein the bleed valve is configured to control flow of the bleed airflow from the bleed cavity.

16. A method of operating a gas turbine engine, comprises:

rotating a compressor, thereby urging an airflow through the compressor to compress and heat the airflow;

diverting a portion of the airflow from the compressor through a compressor bleed valve and along a bleed pathway, the compressor bleed valve including:
a valve support;
a valve element disposed at the valve support and movable relative to the valve support from an open position into a closed position engaged with a valve seat;

heating a volume of phase change material disposed in the valve support between the valve support and the valve element, thus causing a phase change and expansion of the phase change material;

closing the compressor bleed valve by moving the valve element from the open position to the closed position via the expansion of the phase change material.

17. The method of claim 16, wherein the phase change is from a solid phase to a liquid phase.

18. The method of claim 16, wherein:

the valve element includes a valve piston engageable with the valve seat, and a valve stem extending from the valve piston, the valve stem received in a support cavity of the valve support; and the volume of phase change material is disposed in the support cavity.

19. The method of claim 18, wherein the valve piston is substantially circular.

20. The method of claim 16, wherein the phase change material is a wax material.

* * * * *